United States Patent [19]

Cullen et al.

[11] 4,116,649

[45] Sep. 26, 1978

[54] SELF-RETAINING ADSORBENT BAG UNIT

[75] Inventors: John S. Cullen, Buffalo; Paul W. Huber, Lancaster, both of N.Y.

[73] Assignee: Multiform Desiccant Products, Inc., Buffalo, N.Y.

[21] Appl. No.: 649,586

[22] Filed: Jan. 16, 1976

[51] Int. Cl.² ............................................. B01D 39/00
[52] U.S. Cl. ........................................ 55/387; 55/507;
  55/509; 55/529; 206/204; 150/1; 62/474
[58] Field of Search ...................... 210/282; 55/23, 29,
  55/316, 387, 490, 507, 508, 509, 529; 62/85,
  474; 206/210, 806, 204, 205; 312/31, 31.1, 31.3;
  150/2.6, 1

[56] References Cited

U.S. PATENT DOCUMENTS

| | | | |
|---|---|---|---|
| 2,578,324 | 12/1951 | Southwick, Jr. | 55/387 |
| 2,649,923 | 8/1953 | Woppman | 55/387 |
| 2,702,034 | 2/1955 | Walter | 210/282 X |
| 2,732,074 | 1/1956 | Kuthe | 55/387 X |
| 3,224,586 | 12/1965 | Wade | 210/282 |
| 3,565,327 | 2/1971 | Rodley | 229/54 C |
| 3,734,296 | 5/1973 | Proctor et al. | 210/288 |
| 3,873,735 | 3/1975 | Chalin | 426/113 X |

FOREIGN PATENT DOCUMENTS

| | | | |
|---|---|---|---|
| 987,856 | 10/1951 | France | 206/806 |
| 691,578 | 5/1953 | United Kingdom | 210/337 |
| 233,773 | 5/1925 | United Kingdom | 55/387 |

Primary Examiner—Frank W. Lutter
Assistant Examiner—David L. Lacey
Attorney, Agent, or Firm—Joseph P. Gastel

[57] ABSTRACT

An adsorbent unit including a container, adsorbent in the container, a resiliently flexible flap having a first portion attached to the container and having an aperture in a second portion thereof which is adapted to fit over a conduit, with the dimensions of the aperture and the conduit being such that the resilient flexibility of the flap will cause it to lock to the conduit in the area of the aperture.

33 Claims, 9 Drawing Figures

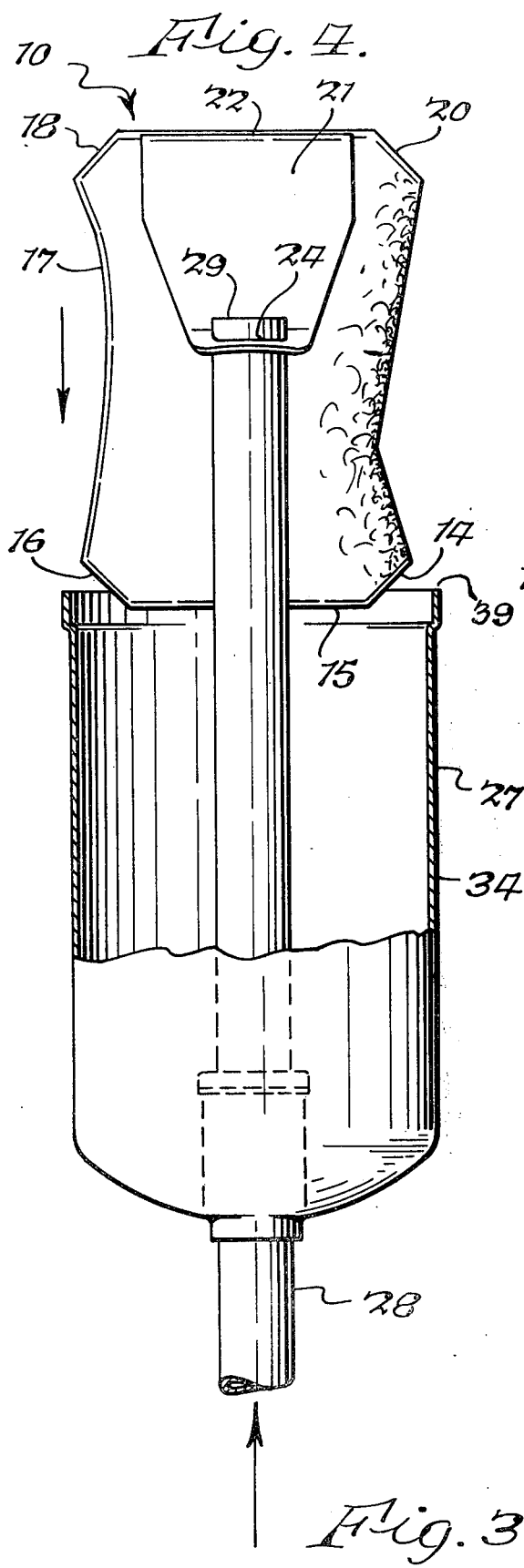
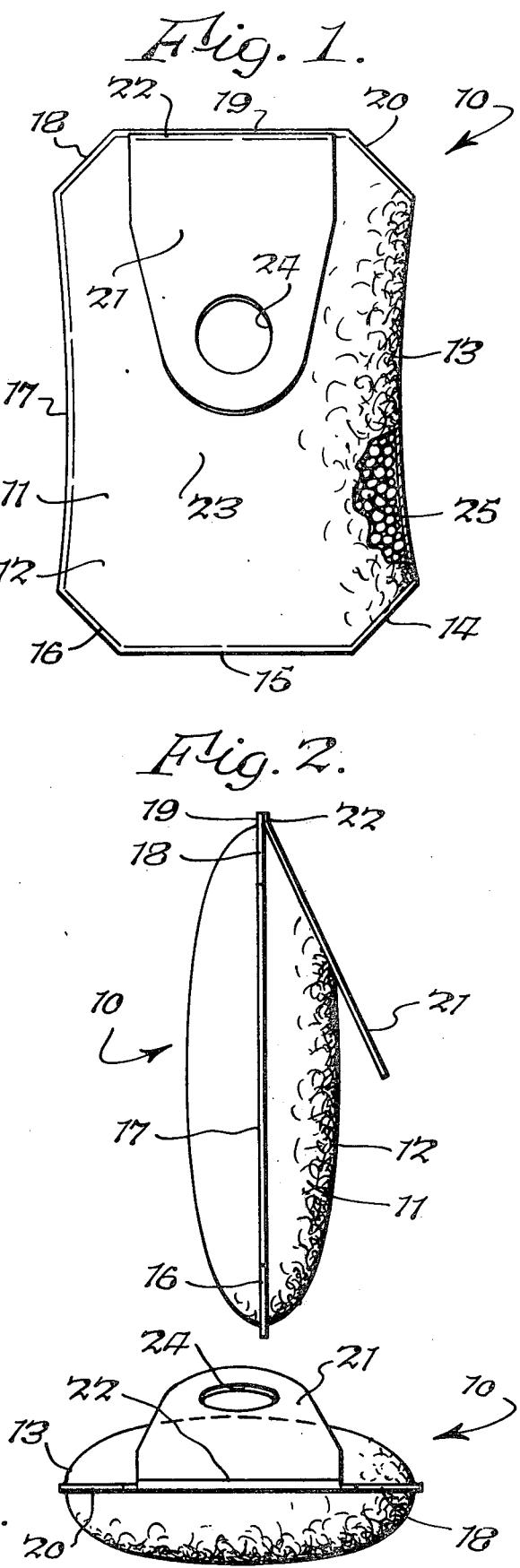

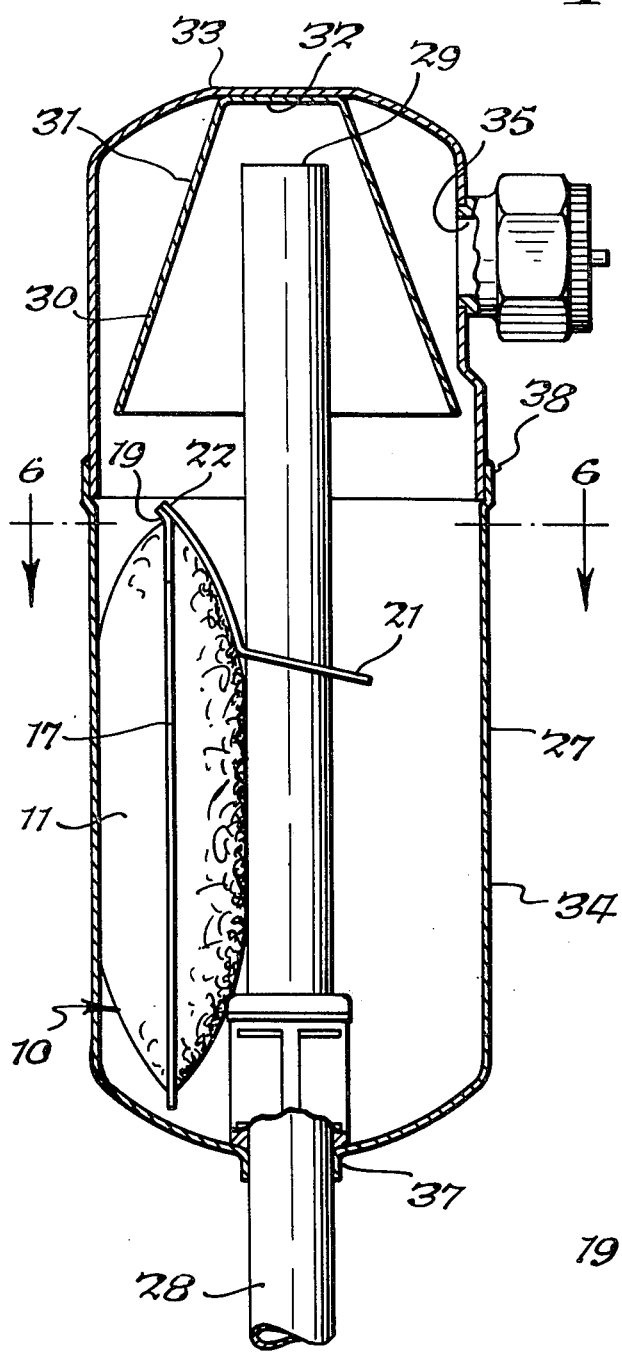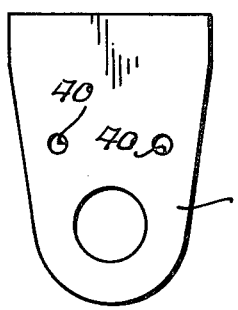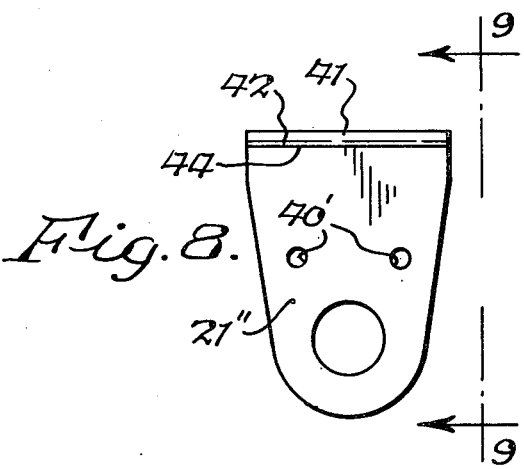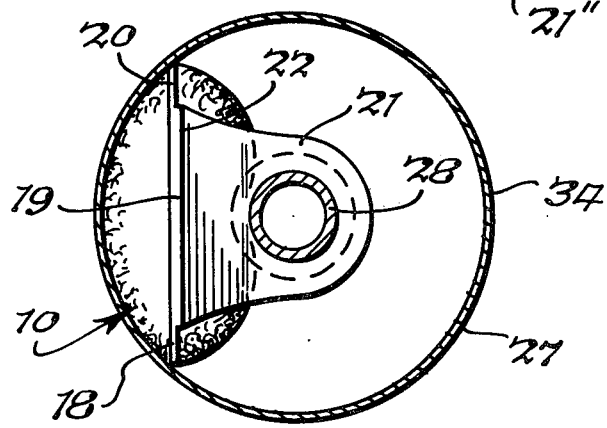

SELF-RETAINING ADSORBENT BAG UNIT

The present invention relates to an improved adsorbent unit which includes an adsorbent container and securing means attached thereto for holding it in position in its desired environment.

It is desirable to place an adsorbent container in the receiver of a refrigeration system to adsorb undesirable substances from the refrigerant. The adsorbent container should be fixedly positioned within the receiver so that it cannot move about, thereby obviating the possibility of obstructing refrigerant flow or becoming worn and bursting due to abrasive action. In the past, the immobilizing of the adsorbent container required extra parts or extra labor. It is with overcoming the foregoing deficiencies of prior adsorbent containers that the present invention is concerned.

It is accordingly one object of the present invention to provide an improved adsorbent unit which has a securing member integrally formed therewith and which can be fixedly positioned in its operating environment in an extremely simple and expedient manner.

Another object of the present invention is to provide an improved adsorbent unit containing a securing arrangement which can be fabricated in an extremely simple manner and at a relatively low cost.

A further object of the present invention is to provide an improved adsorbent unit containing an integral attachment structure in which the attachment structure does not appreciably obstruct the remainder of the adsorbent container.

Yet another object of the present invention is to provide an improved adsorbent unit in which the inherent resilient flexibility of the securing structure is utilized to lock the remainder of the container in its operative position. Other objects and attendant advantages of the present invention will readily be perceived hereafter.

The present invention relates to an adsorbent unit comprising a container, adsorbent in said container, elongated flexible securing means having first and second spaced portions, first means attaching said first portion to said container, and second means on said second portion for attaching said securing means to an object.

The present invention also relates to an adsorbent unit and a receptacle comprising an adsorbent container including a flexible wall portion, securing means attached to said flexible wall portion, said receptacle comprising a housing and internal means within said housing, said adsorbent container being located in said housing and being wedged between said housing and said internal means within said housing, and said securing means being attached to said internal means.

The various aspects of the present invention will be more fully understood when the following portions of the specification are read in conjunction with the accompanying drawings wherein:

FIG. 1 is a side elevational view of the improved adsorbent container of the present invention;

FIG. 2 is an end elevational view of the container of FIG. 1;

FIG. 3 is a top plan view of the container of FIG. 1;

FIG. 4 is a view showing the position which the adsorbent container unit assumes during the initial stage of installation into the receiver;

FIG. 5 is a fragmentary cross sectional view showing the adsorbent container unit in position in a receiver of a refrigeration system;

FIG. 6 is a cross sectional view taken substantially along line 6—6 of FIG. 5;

FIG. 7 is a plan view of a preferred form of flap which can be used instead of the flaps shown in FIGS. 1-6;

FIG. 8 is a plan view of an alternate form of flap which is molded; and

FIG. 9 is a fragmentary cross sectional view taken substantially along line 9—9 of FIG. 8.

The improved adsorbent unit 10 of the present invention is an improvement over the adsorbent package shown in copending application of the present inventors Ser. No. 495,883, filed Aug. 8, 1974, now abandoned which is a continuation of Ser. No. 293,677, filed Sept. 29, 1972, now abandoned. Adsorbent unit 10 comprises an elongated generally pillow-shaped bag or container 11 having an enclosing wall 12 of thermoplastic felted fibrous sheet material. The container 11 is made from a blank of sheet material of appropriate outline, folded upon itself along one longitudinal side 13. The superimposed edge portions of wall 12 are fused together to form a continuous seam from individual fused seams 14, 15, 16, 17, 18, 19 and 20 to provide a completely enclosed container. The continuous fused seam 14–20, inclusive, is made by applying suitable heat to these portions, considering that container 11 is fabricated from thermoplastic sheet material such as felted polypropylene which will melt when heated. By way of example, the wall is between 0.065 and 0.097 inches thick and has a weight of about 9 ounces per square yard. The container or bag 11 may be made out of any other suitable fibers which will provide a porous material, and which can be joined, as by fusion, gluing, or any other suitable manner.

Preferably the container 11 is made by initially forming seams 14, 15, 16 and 17. Thereafter, the container is filled with adsorbent 25 through the opening which is later closed by seams 18, 19 and 20. During the forming of seam 19, a flexible resilient plastic flap 21 has its edge portion 22 fused to seam 19. Flap 21 is fabricated from sheet polypropylene and by way of example has a thickness of about 0.030 inches. It will be appreciated that the materials of container 11 and flap 21 must have melt indices which are sufficiently close so that the above described fusion can be effected. Flap 21 extends from edge portion 22 toward the central portion 23 of container 11. An aperture 24 is provided in flap 21.

Adsorbent 25 may be of any desirable composition and may selectively include, without limitation, adsorbents such as silica gel, metal alumino silicate, alumina, calcium sulphate, activated charcoal, molecular sieve, or any other desired compound in bead, pellet or granular form.

In FIG. 5 a refrigerant receiver 27, which is essentially a cylindrical receptacle, is shown having a concentric inlet conduit 28 leading to the compressor of a refrigerating system. The gaseous-liquid refrigerant coming from the evaporator flows from conduit 35 and impinges on the external surface 30 of frustoconical baffle 31 which has its end 32 affixed, as by welding, to the inside of cover portion 33. The liquid portions of the refrigerant drop to the bottom of portion 34 of receiver 27 and the undesirable components are adsorbed by adsorbent container 10. Gaseous refrigerant passes into the top 29 of conduit 28 leading to the compressor. As will be understood, the receiver bottom portion 34 is suitably secured to conduit 28 at 37 in a fluid-tight manner. Also, cover portion 33 is attached to housing portion 34 at lap joint 38 in a fluid-tight manner, as is required in refrigeration equipment.

As can be seen from FIG. 4, the initial step in installing the adsorbent unit 10 into receiver 27 consists of the step of placing aperture 24 over the end of conduit 28 and simultaneously positioning seams 14, 15 and 16 within the confines of upper edge 39 of housing portion 34 so that the adsorbent container 11 may be moved longitudinally on conduit 28 into housing portion 34 of the receiver until it occupies the position shown in FIG. 5. In an actual installation, aperture 24 is of a diameter of 0.755 inches while conduit 28 is of a diameter of 0.750 inches. The difference in diameters is thus 0.005 inches. By virtue of the foregoing size relationship, flap 21 can be pushed downwardly on conduit 28 while container 11 is moving downwardly. However, if an attempt is made to pull the bag 10 upwardly, without holding aperture 24 substantially perpendicular to the axis of conduit 28, the flap will lock to conduit 28. When the container 11 is in position the locking is due to the fact that the resilient flexibility of flap 21 will bias it to as oblique as possible a position relative to the axis of conduit 28 when container 11 is confined to the space between housing portion 34 and conduit 28, thereby insuring the locking engagement between flap 21 and conduit 28. It is to be further noted that flap 21 in its normal unstressed position is straight as shown in FIGS. 1, 2 and 3. It will return to a straight condition when distorting forces are removed. Thus is is self-sustaining in the configuration in which it was originally fabricated. It assumes a bent position, such as shown in FIGS. 5 and 6, only when it is forced to do so because of the opposing forces placed on it by conduit 28, on one hand, and container 11 on the other hand, which is confined against movement by the wall of housing 34, as can be seen from FIGS. 5 and 6.

It is to be especially noted that practically the only force on container 11, when installed as shown in FIG. 5, is the buoyant force of the refrigerant. However, this force cannot place an appreciable stress on flap 21 because container 11 is wedged between pipe 28 and housing portion 34. Even if there should be an upward force on container 11, this will place flap 21 in tension, which is the most desirable stress application which will both prevent rupture of flap 21 and its separation from container 11 at seam 19.

Flap 21, while holding container 11 firmly in position, leaves substantially the entire container 11 open and unobstructed so that the adsorbent therein can be exposed to the refrigerant. Furthermore, it will readily be appreciated that flap 21 is secured to container 11 during the process of forming seam 19, and therefore there is no appreciable labor burden associated with flap 21. In addition, flap 21 does not take up any appreciable space within receiver 27 and therefore there need not be any allowance therefor. The flexibility of flap 21 coupled with the pliability of container 11 permits the adsorbent assembly 10 to be manipulated into desired position within receiver 27 in an extremely simple and expedient manner.

In FIG. 7 a preferred form of flap 21' is shown. This flap may be identical in all respects to the flap 21 shown in FIGS. 1-6. It differs from flap 21 in that it contains locating holes 40 used by fabricating equipment for locating the flap 21' relative to the remainder of the container during assembly. In addition, holes 40 permit circulation of liquid through flap 21'.

In FIGS. 8 and 9 an alternate form of flap 21'' is shown which is molded rather than stamped, as is the flap shown in FIGS. 1-7. This flap also has holes 40' which are analogous to holes 40 of FIG. 7. The main difference in the molded flap 21'' resides in the thin edge portion 41 at the top of the flap, a portion of which is secured at seam 19 so that the remainder of portion 41 acts as a hinge to facilitate the ease with which flap 21'' can be moved relative to the remainder of container 11 to enhance the ease of installation. A first radius 42 and a second radius 44 are provided in the locations shown in FIG. 9.

While the various flaps such as 21, 21' and 21'' have been disclosed as being bonded to the seam, it will be appreciated that they can also be bonded to a more central portion of container 11. In addition, if desired the end of any of the flaps such as 21 can be bent over and contain aligned apertures in the main portion and the bent-over portion, to provide a more secure locking arrangement. In this respect, the conduit such as 28 would pass through two apertures in the flap.

While fused seams 14-20, inclusive, are preferable in accordance with the teaching of the above-mentioned copending application Ser. No. 495,883, filed Aug. 8, 1974, it will be appreciated that a fused seam structure is not necessary for the practice of the present invention and it is to be clearly understood that the edges depicted by seams 14-20, inclusive, and 22 may be joined by any other suitable process, such as stitching or gluing or the like, and further that flap 21 may be attached to container 11 in any other suitable manner.

While preferred embodiments of the present invention have been disclosed, it will be appreciated that the present invention is not limited thereto but may be otherwise embodied within the scope of the following claims.

What is claimed is:

1. An adsorbent unit for mounting on the outside of a conduit comprising a container, adsorbent in said container, said container having a peripheral edge portion and a central portion, a flexible flap having first and second spaced portions, attaching means attaching said first portion proximate said peripheral edge portion with said flap extending toward said central portion, and securing means on said second portion for mounting said flap on the outside of a conduit.

2. An adsorbent unit as set forth in claim 1 wherein said securing means comprises an aperture in said flap.

3. An adsorbent unit as set forth in claim 2 wherein said flap is an elongated and resiliently flexible member tending to return to a predetermined original configuration when unstressed but which is distorted when said conduit is received by said aperture.

4. An adsorbent unit as set forth in claim 2 wherein said aperture is located in contiguous relationship to said central portion.

5. An adsorbent unit as set forth in claim 2 wherein said container and said flap are both fabricated from plastic, and wherein said attaching means comprises a fused area therebetween.

6. An adsorbent unit as set forth in claim 5 wherein said container is fabricated from a plastic cloth-like material and wherein said flap is fabricated from sheet material.

7. In combination, an adsorbent unit and a receptacle comprising an adsorbent container including a flexible wall portion, securing means attached to said flexible wall portion, said receptacle comprising a housing, and internal means within said housing, said adsorbent container being located in said housing and being wedged between said housing and said internal means within said housing, and said securing means being attached to said internal means.

8. An adsorbent unit as set forth in claim 7 wherein said internal means comprises a conduit, and wherein said securing means comprises an elongated resilient flap having an aperture therein receiving said conduit.

9. An adsorbent unit as set forth in claim 8 wherein said flap tends to return to a planar condition when unstressed and wherein said aperture is slightly larger than said conduit.

10. An adsorbent unit as set forth in claim 9 wherein said flap is oriented at a non-perpendicular angle to said conduit in mounted position so that a locking effect is obtained between said aperture and said conduit.

11. An adsorbent unit for mounting on the outside of a conduit comprising a container, adsorbent in said container, elongate flexible flap means having first and second spaced portions, first means permanently attaching said first portion to said container as an integral part thereof, and aperture means on said second portion for mounting said flap means on the outside of a conduit.

12. An adsorbent unit as set forth in claim 11 wherein said first means comprises an adhesive attachment between said flap means and said container.

13. An adsorbent unit as set forth in claim 11 wherein said elongated flexible flap means is a resilient member tending to return to a predetermined original configuration when unstressed.

14. An adsorbent unit as set forth in claim 13 wherein said first means comprises an adhesive attachment between said flap means and said container.

15. An adsorbent unit as set forth in claim 14 wherein said adhesive attachment comprises a fused area between said container and said flap means.

16. An adsorbent unit as set forth in claim 15 wherein said container is a flexible porous cloth-like plastic bag and wherein said flap is fabricated from plastic.

17. An adsorbent unit as set forth in claim 16 wherein said fused area is at a seam of said bag.

18. An adsorbent unit as set forth in claim 11 wherein said container is fabricated from plastic porous cloth-like material.

19. An adsorbent unit as set forth in claim 11 wherein said elongated flexible flap means is fabricated from plastic sheet material.

20. An adsorbent unit as set forth in claim 19 wherein said elongated flexible flap means is a resilient member tending to return to a predetermined original configuration when unstressed.

21. An adsorbent unit as set forth in claim 19 wherein said container includes an edge portion and a central portion and wherein said first portion of said flap means is attached proximate said edge portion, and said second portion of said flap means extends toward said central portion.

22. An adsorbent unit as set forth in claim 21 wherein said elongated flexible flap means is a resilient member tending to return to a predetermined original configuration when unstressed.

23. An adsorbent unit comprising a container, adsorbent in said container, elongated flap means, first and second spaced portions on said flap means, means attaching said first portion to said container, securing means on said second portion for locking attachment to an object, said flap means being flexible so as to be capable of being deformed into said locking engagement with said object, and said flap means also being resilient so as to tend to return to a predetermined unstressed configuration when external forces are removed whereby said resilience maintains said flap means in said locking engagement with said object.

24. An adsorbent unit as set forth in claim 23 wherein said container is pliable to permit said flap means to change its orientation relative to said container as a result of flexing of said container.

25. An adsorbent unit as set forth in claim 24 wherein said container is fabricated from porous cloth-like material.

26. An adsorbent unit as set forth in claim 25 wherein said porous cloth-like material is plastic and wherein said flap means is plastic, and wherein said means attaching said first portion to said container comprises a fused area between said container and said flap means.

27. An adsorbent unit as set forth in claim 23 wherein said securing means comprises aperture means for encircling said object, and wherein said aperture means and said object are of such relative sizes so that such relative sizes in conjunction with said resilient flexibility causes locking engagement between said flap at the area of said aperture means and said object.

28. An adsorbent unit as set forth in claim 27 wherein said container includes an edge portion and a central portion, and wherein said first portion is attached proximate said edge portion and wherein said flap means extends toward said central portion.

29. In combination, an adsorbent unit and a housing comprising an adsorbent container including a flexible wall portion, adsorbent in said container, securing means attached to said flexible wall portion for securing said container within said housing, and conduit means within said housing for conducting refrigerant, said adsorbent container being wedged against said conduit means, and said securing means being attached to said conduit means.

30. The combination set forth in claim 29 wherein said securing means comprises an elongated resiliently flexible flap tending to return to a predetermined original configuration when unstressed.

31. The combination set forth in claim 30 wherein said flap is fabricated from plastic sheet material and wherein said container includes an edge portion and a central portion, and wherein said flap includes a first portion and a second portion spaced therefrom, said first portion being attached proximate said edge portion and said second portion being remote from said edge portion, and said securing means being on said second end portion.

32. The combination set forth in claim 30 wherein said second portion of said flap extends toward said central portion of said container.

33. An adsorbent unit for mounting on the outside of a conduit comprising a plastic container, adsorbent in said container, said container having a peripheral edge portion and a central portion, a resilient flexible sheet plastic flap having first and second spaced portions, a fused area attaching said first portion to said container proximate said peripheral edge portion, and securing means on said second portion for securing said flap relative to the outside of a conduit.

* * * * *

UNITED STATES PATENT AND TRADEMARK OFFICE
CERTIFICATE OF CORRECTION

PATENT NO. : 4,116,649
DATED : September 26, 1978
INVENTOR(S) : John S. Cullen and Paul W. Huber It is certified that error appears in the above-identified patent and that said Letters Patent are hereby corrected as shown below:

Column 5, line 20 (claim 11), change "elongate" to
--elongated--;

Line 46 (claim 19), change "11" to --18--.

Signed and Sealed this

Nineteenth Day of December 1978

[SEAL]

Attest:

RUTH C. MASON
Attesting Officer

DONALD W. BANNER
Commissioner of Patents and Trademarks